(12) United States Patent
Lien et al.

(10) Patent No.: US 6,543,685 B1
(45) Date of Patent: Apr. 8, 2003

(54) CARD PROCESSING APPARATUS FOR CARD ENCODER AND PRINTER THEREIN

(75) Inventors: Brent D. Lien, Minneapolis, MN (US); Darren W. Haas, Eden Prairie, MN (US); Matthew K. Dunham, Eagan, MN (US)

(73) Assignee: Fargo Electronics, Inc., Eden Praire, MN (US)

( * ) Notice: Subject to any disclaimer, the term of this patent is extended or adjusted under 35 U.S.C. 154(b) by 0 days.

(21) Appl. No.: 09/393,465

(22) Filed: Sep. 10, 1999

Related U.S. Application Data

(60) Provisional application No. 60/100,141, filed on Sep. 14, 1998.

(51) Int. Cl.[7] .................................................. G06K 5/00
(52) U.S. Cl. .......................... 235/380; 400/541; 101/4; 101/44
(58) Field of Search ................................ 235/380, 379, 235/384, 439, 449, 492, 493; 400/521, 525, 544, 541; 101/3.1, 4, 18, 44; 271/270, 276

(56) References Cited

U.S. PATENT DOCUMENTS

| | | | |
|---|---|---|---|
| 4,237,624 A | * 12/1980 | Yeh | 360/2 |
| 4,297,735 A | * 10/1981 | Eppich | 360/130.3 |
| 4,538,191 A | * 8/1985 | Suzuki et al. | 360/291 |
| 4,617,080 A | 10/1986 | Kobayashi et al. | 156/359 |
| 4,825,054 A | * 4/1989 | Rust et al. | 235/380 |
| 4,827,425 A | * 5/1989 | Linden | 235/380 X |
| 4,937,438 A | * 6/1990 | Warwick et al. | 235/446 |
| 5,326,179 A | 7/1994 | Fukai et al. | 400/120 |
| 5,636,928 A | * 6/1997 | Shiina et al. | 400/636 |
| 5,673,076 A | 9/1997 | Nardone et al. | 347/171 |
| 5,768,143 A | 6/1998 | Fujimoto | 364/479.05 |
| 5,807,461 A | 9/1998 | Hagstrom | 156/361 |
| 5,962,832 A | 10/1999 | Dorner | 235/380 |

FOREIGN PATENT DOCUMENTS

| | | |
|---|---|---|
| DE | 196 44 306 | 5/1998 |
| EP | 0 597 135 | 5/1994 |
| JP | 62-192991 | * 8/1987 |
| JP | 63-265378 | * 11/1988 |
| WO | WO 98/51508 | 11/1998 |

* cited by examiner

*Primary Examiner*—Diane I. Lee
(74) *Attorney, Agent, or Firm*—Westman, Champlin & Kelly, P.A.

(57) ABSTRACT

A card printing and encoder apparatus for printing information on a card to provide identification of a person, and includes two encoding stations, one to encode a smart card chip embedded in the card, and the other station to encode a magnetic strip on the card. Card support and drive rollers support the card, and the card is bent out of its plane to contact the smart card encoding station contacts. A magnetic head for encoding a magnetic strip is held under a resilient force against an opposite side of the card from the smart card encoding station. The loading of the print head against a rotatable print platen is controlled in synchronism with card drive and support rollers so that the card drive and support rollers release and the card is driven only by the rotatable print platen during the printing operation.

11 Claims, 8 Drawing Sheets

CARD PROCESSING APPARATUS FOR CARD ENCODER AND PRINTER THEREIN

CROSS REFERENCE TO RELATED APPLICATION

The present invention claims priority to Provisional Application Serial No. 60/100,141, filed Sep. 14, 1998, and entitled CARD PRINTER AND ENCODER.

BACKGROUND OF THE INVENTION

The present invention relates to a card printer that will receive identification cards of a range of sizes and shapes and feed them through various stations, for not only printing information on the card in several colors, such as a photo, name, address and the like, but also encoding a magnetic strip on the card and adding in a program into an embedded chip for "smart card" status.

Presently personal identification cards are carrying more and more information. While magnetic strips have long been used on identification cards, the so called "smart card" require encoding particular information into a chip on the card so that it can be read for identifying and providing information about the party holding the card. Also, smart card information can be used for authorizing transactions through remote network systems or the like. In order to be effective, the cards have to be processed rapidly and at low cost. The encoding process also has to be accurate.

SUMMARY OF THE INVENTION

The present invention relates to a self contained printer that is very compact, and includes card feeding transfer rollers on opposite sides of a printing head that has a powered platen against which the card can be pressed when the printing occurs. One or more stations for encoding information may be provided. For example, one or both of the stations needed for encoding a chip on a smart card or for adding magnetic information on the magnetic strip may be provided. These stations are provided adjacent to each other near the output end of the printer.

The operations on the card are sequenced, so that the card will be introduced into transfer rollers, and a central control for the system senses the presence of a card and powers suitable stepper motors for driving of the card to its various locations. A platen roller for the printing head, the smart card encoding station and the magnetic strip encoding station are all centrally controlled. Optionally, either one or both of the smart cards or magnetic encoding stations may be provided. The smart card encoder has a sensor that senses when a card is in a proper or home position for encoding. In order to encode the chip on the card, an array of contacts that transfer information from an input program in the central control to the chip on the smart card is positioned in a housing above the plane of the normal movement of the card, and a cam will bend the card upwardly into a home position. When it is sensed that the card is in home position, the encoding occurs.

The encoding is carried out for a selected length of time and then the cam that bends the card is moved so that the card again assumes the planar position, and is driven back to the station for engaging a magnetic encoding head. The same drive shaft as used for the smart card cam drives a leaf spring to push the magnetic encoding head into position for encoding the magnetic strip on the card. The magnetic encoding process is carried out using information from the central control along the length of the card by moving the card across the head. The card length is determined by the driving of the card past a sensor when the card is initially introduced into the printer. The magnetic head is then retracted and the card is placed into a printing station and the print head is lowered to working position. The card is printed in selected colors by making multiple passes in a normal manner. After printing, the card is driven out of the printer into a storage bin or area.

The printing head is urged under spring load to move toward its printing position and is held in a raised position by a cam during operations on the card other than printing, such as encoding.

DETAILED DESCRIPTION OF THE PREFERRED EMBODIMENTS

The printer 13A of the present invention includes a print head illustrated generally at 10 that is mounted on a pivoting frame 12. The frame 12 is formed with two arms, 11-11, held together with suitable cross members, and is pivotally mounted on a shaft 44. The shaft 44 is rotatably mounted in side frame plates 13 of a printer housing or main frame 13B. The print head frame 12 is latched in place on the housing 13B with a suitable latch 12A and the print head frame 12 can be released and pivoted counter clockwise for access to conventional print ribbon mounting rollers 12B shown only schematically in FIG. 1. The print ribbon is represented in dotted lines as well. Other components can also be accessed when the printer head frame 12 is pivoted upwardly counterclockwise.

A stationary sub-frame 15 has a top card support wall 16 that slidably receives individual precut plastic cards 19 from the card supply and feeder 14. The cards move along card support wall 16 into a pair of card transport rollers including a first driver transfer roller 18 that is powered from a suitable motor shown schematically at 20, and which has idler roller 22 spring loaded against the transfer roller with ends of a leaf spring 24 bearing on each end of the roller shaft 25 (See FIG. 9). The shaft 25 is guided in slot 25A formed by suitable guide tabs 26 bent down from wall 16.

The stationary cross sub-frame 15 extends between side plates 13 and mounts idler rollers, a card support wall 16 and other components.

Figure 5:
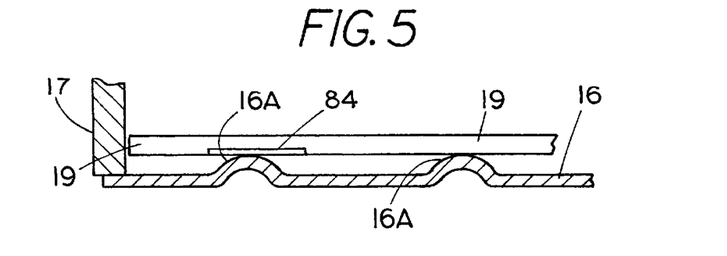
FIG. 5 is a fragmentary sectional view taken on line 5—5 in FIG. 1.

The card support 16 has a pair of raised rails or ribs 16A, 16A (see FIG. 5) that will reduce the friction on a card 19 in FIG. 5 and keeps the card stable as it is being moved along the rails 16A. The ribs or rails 16A are also tapered to form a crowned center portion in a longitudinal direction. That is the rails or ribs are low at both the entry and exit ends and higher in the middle. The sides of the cards are guided by suitable side rails 17, as well.

It can be seen that when the idler roller 22 that provides the spring pressure on the transfer roller 18 is in working position against the transfer roller 18, it is above the level of the ribs 16A. Thus the card will be lifted and driven by the transfer roller 18.

Figure 6:
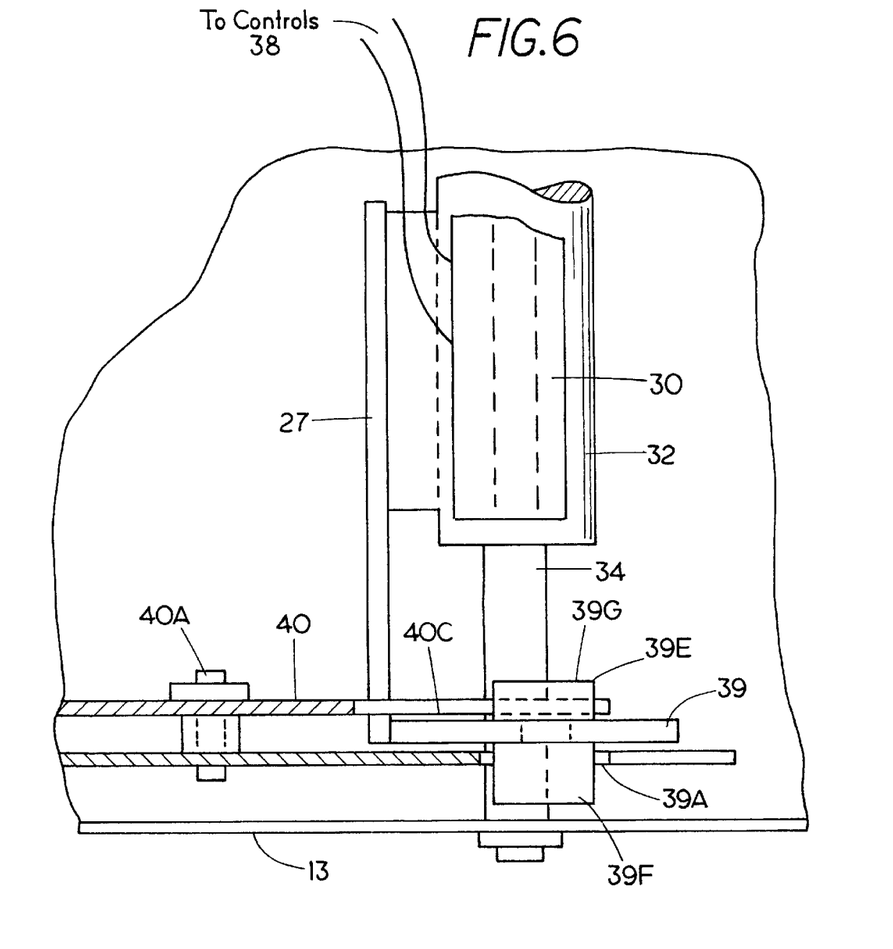
FIG. 6 is a schematic partial top sectional view of the print head mounting taken generally on line 6—6 in FIG. 2.

The pivoting print head frame 12 supports a print head assembly 28 made in accordance with known parameters. A cross member 27 (FIG. 6) mounts a print head member 30 aligned with a rotatably mounted and power-driven platen 32 that is suitably mounted in bearings on side plates 13 and is driven from stepper motor 20, as shown schematically. The motor 20 drives platen 32 through a gear set. The stepper motor 20 can be controlled from a central control arrangement comprising a microprocessor or computer and indicated at 38. The central control computer 38 will control all of the functions from a central program for printing, magnetic strip encoding, and smart card chip encoding. Other suitable positive drives can be used.

It should be noted that the rails or ribs 16A are segmented at platen roller 32 and are tapered so they are low on both sides of platen roller 32.

When a card is first fed into the printer by transfer roller 18, the leading end is sensed by a sensor 37, and the information is fed back to central control 38. The counts of the stepper motor 20 driving the card made before the trailing end of the card passes the sensor 37 provide length information to the controls 38 for use during further processing. Initially, the print head 30, which is mounted on cross member 27 is lifted or retracted upwardly relative to the platen 32 through the operation of a cam 42 mounted on a shaft 44 that is driven from a motor 46. Motor 46 drives cross shaft 44 which is rotatably mounted on side plates 13.

The cross member 27 also is mounted onto upright print head holder guides 39 (See FIG. 6 for one side) that are positioned closely adjacent to the arms 11 on each side of the pivoting frame 12. A slot shown at 39A is provided in each of the arms 11 for vertically guiding the holders 39, to permit raising and lowering the holders 39, cross member 27, and the print head 30 upwardly and downwardly as desired. The print head 30 is held in place with a leaf spring 39B that is fastened to a suitable cross member 39C extending between the arms 11, and which is fixed thereto, to normally urge the print head, and thus the holders 39, which are formed by the cross member 27, downwardly toward the platen roller 32.

Figure 1:
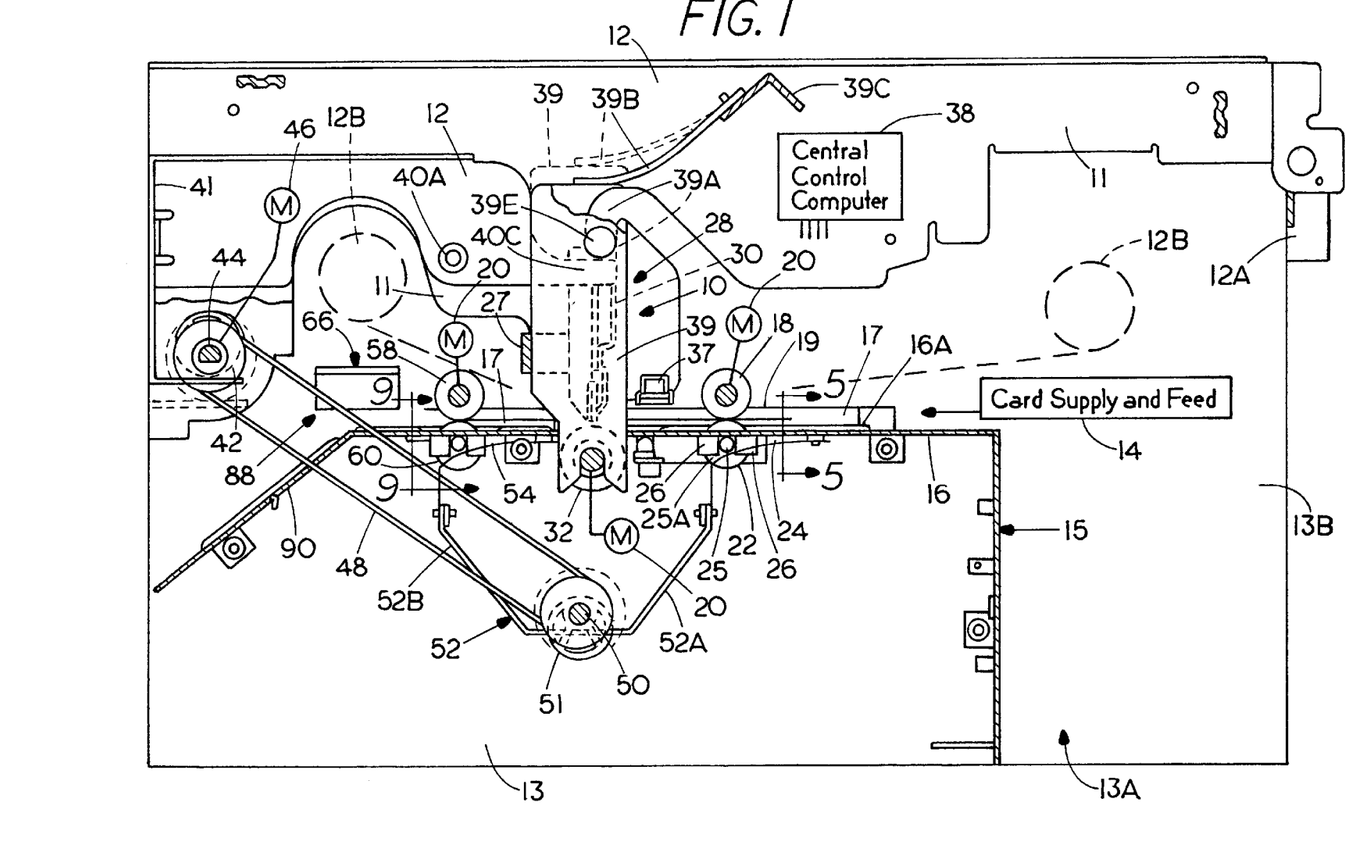
FIG. 1 is a schematic side elevational view of a printer made according to the present invention.
Figure 7:
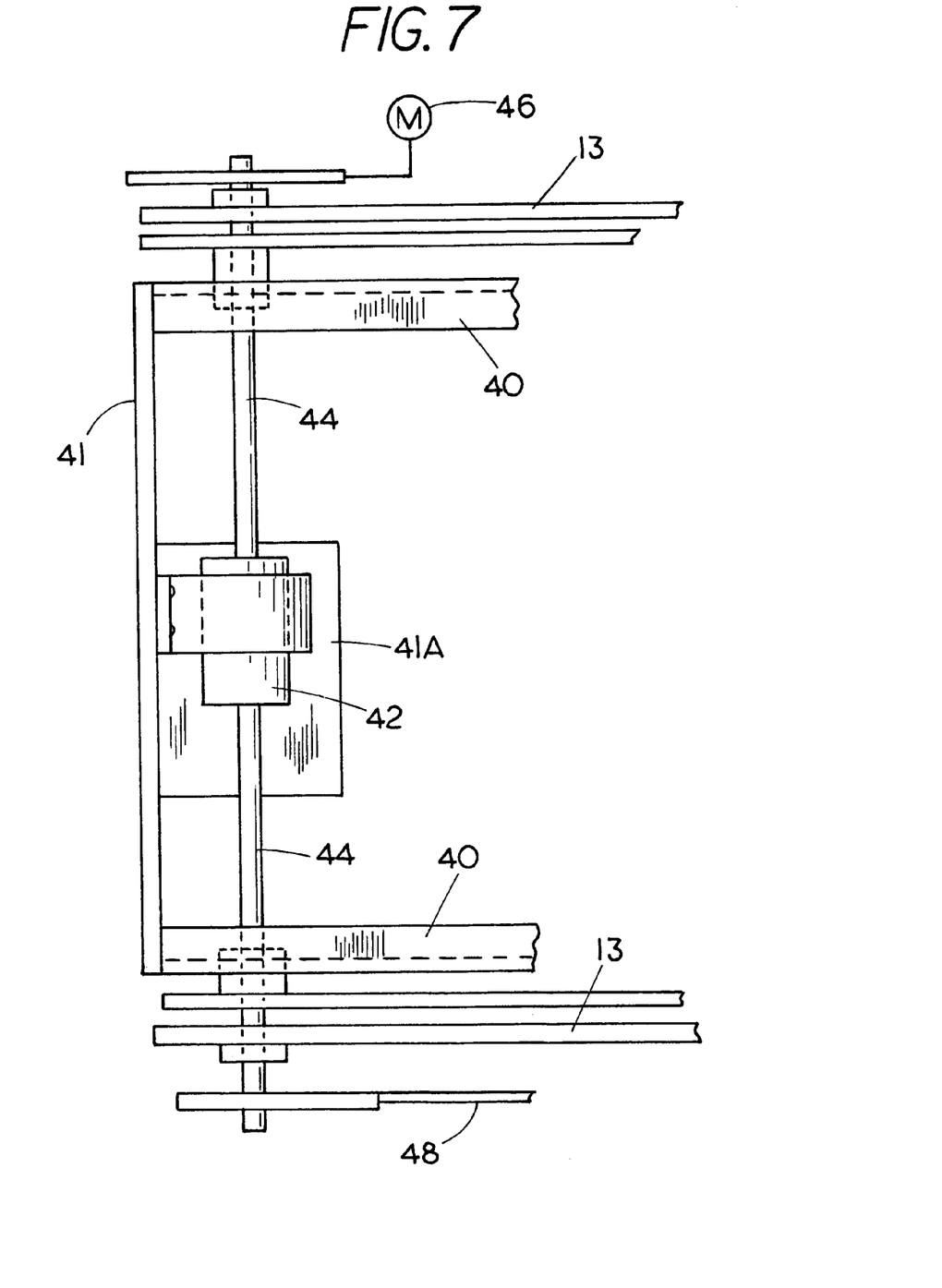
FIG. 7 is a part schematic, partial top sectional view taken as on line 7—7 in FIG. 2.

The lower ends 39B of the holders 39 are bifurcated to provide a slot shown in dotted lines in FIG. 1, and the ends 39B are guided over the shaft 34 of the platen roller 32 to keep the print head properly positioned relative to the platen during printing operations. The holders 39 each have upper guide pins 39E mounted thereon, with head portions 39F and 39G (See FIG. 6) protruding out from the sides of the holder 39. A pair of arms 40 are mounted on suitable pins 40A shown in FIG. 6 and also in FIG. 1. These arms 40 are rotationally mounted to head frame 12 on the pins 40A and are held together with a cam actuator cross member 41 at the rear of the unit. The cross member 41 is bent to have a cam follower 41A at right angles thereto that aligns with a cam 42 (the cam 42 does not extend all the way between the arms 11 as shown in FIG. 7) for operating the print head. A retainer spring 42C rides on the cam 42 to keep it located.

Figure 2:
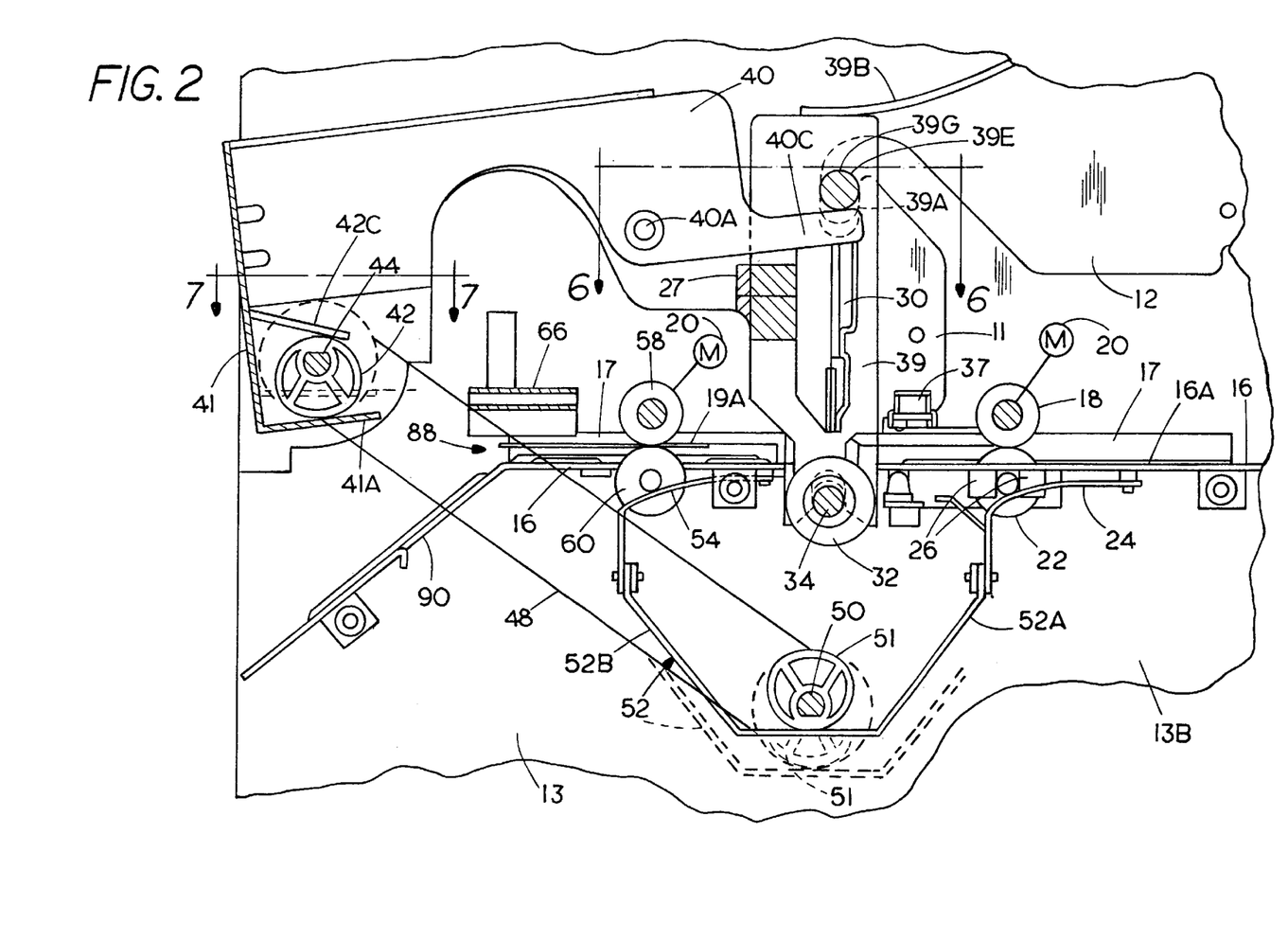
FIG. 2 is an enlarged side view of a print head mounting for the printer of FIG. 1.

When the cam 42 is rotated to move the follower 41A in its position shown in FIG. 2, the print head assembly will be lifted by the arms 40 moving upwardly to bring the pin heads 39E and 39G up in the guide slots 39A sufficiently so the print head will clear the path of the cards 19 being passed between the transfer roller 18, and a second transfer roller 58 also forming part of the card transport. The arms 40 have outwardly extending end portions 40C that fit under the guide pin heads 39G so that there is a lifting action against the action of the leaf spring 39B when the card 19 is being moved into position for encoding, and is being moved back into position for printing.

Figure 3:
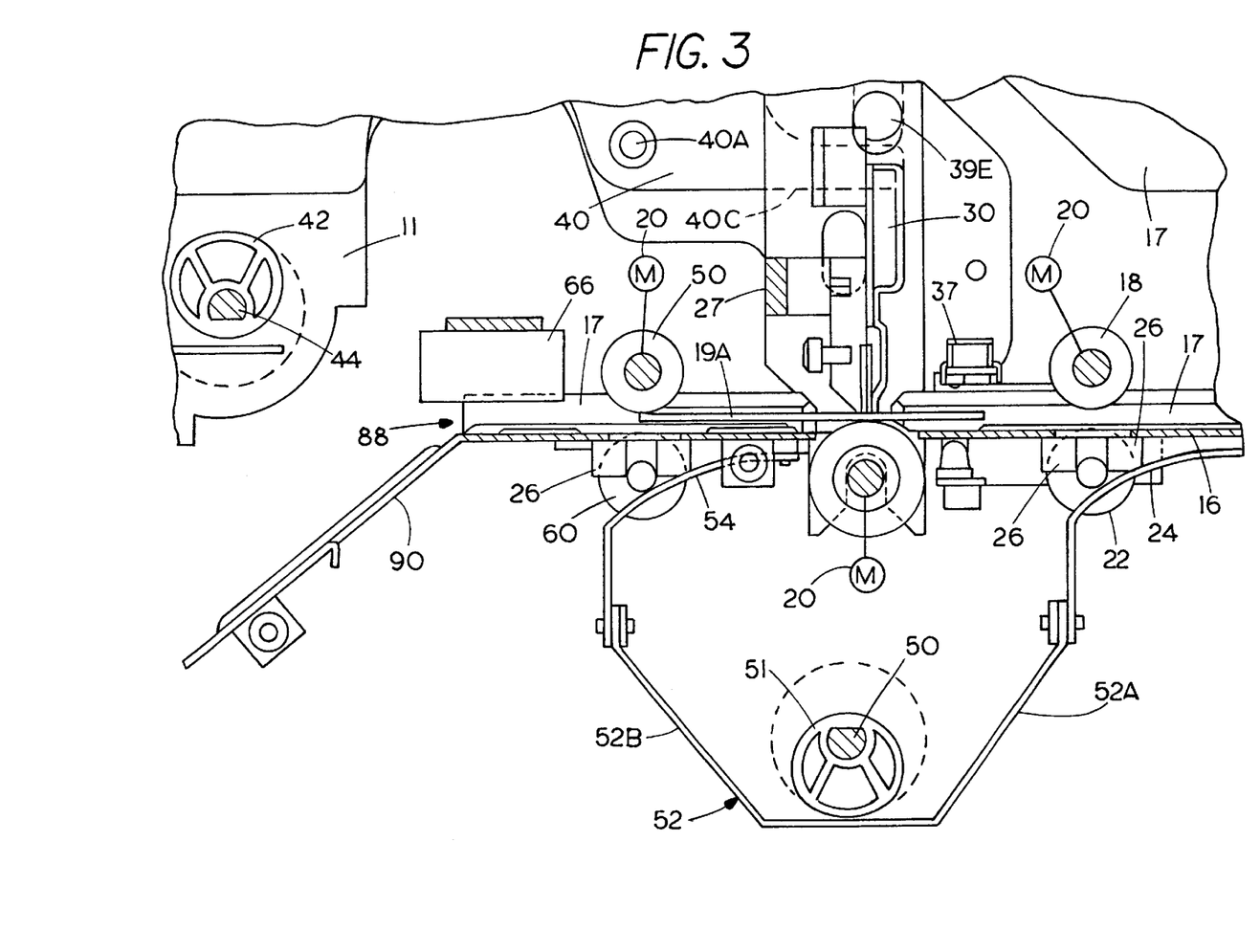
FIG. 3 is a fragmentary enlarged sectional view of the print head platen and idler roller mounting.

The cam 42, which is driven from shaft 44 to lift the print head is synchronized with a second cam that controls the position of the idler rollers for both the transfer or drive roller 18 and the transfer or drive roller 58. A timing belt 48 or other drive member also drives a shaft of 50 that controls the position of the idler rollers 22 and 60 for transfer or drive rollers 18 and 58, so that the idler rollers can be retracted as shown in FIG. 3.

A frame 52, that is a modified "U" shape, has legs 52A and 52B that are connected to leaf springs 54 and 24. The opposite ends of springs 54 and 24 are secured to the support wall 16. The frame 52 is urged upwardly toward its working position shown in FIG. 2 in normal conditions. Note, however, that FIG. 1 is shown with the print head 30 lowered for illustrative purposes. The head 30 would be raised with the frame 52 in the position shown in solid lines. FIG. 2 is illustrates the actual relationship.

Figure 9:
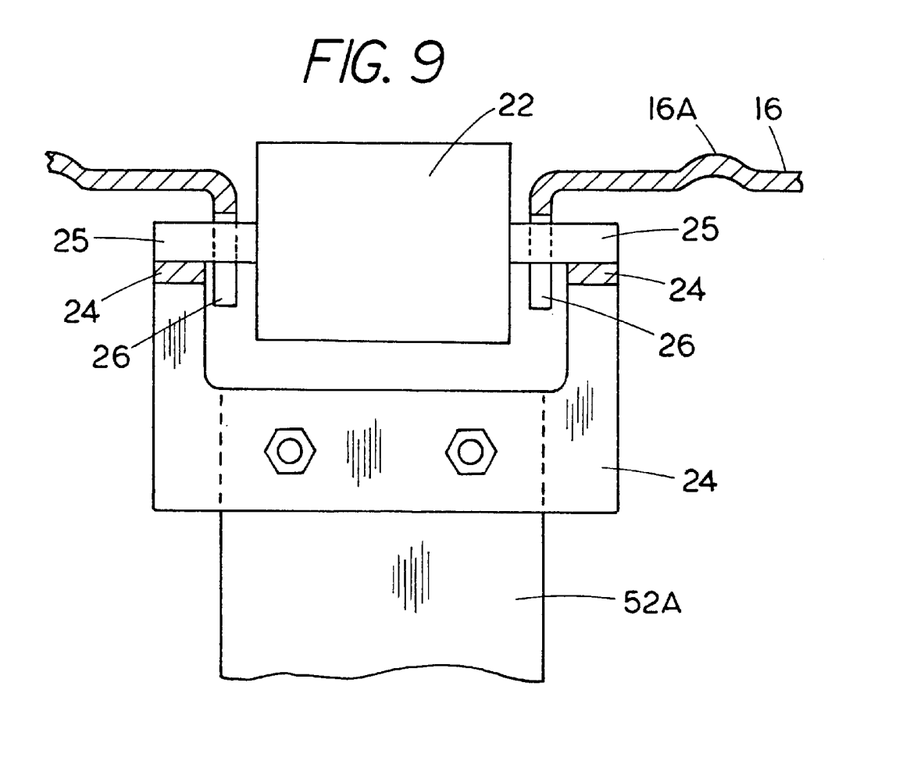
FIG. 9 is an enlarged sectional view taken on line 9—9 in FIG. 1.

When the idler rollers are up, the print head 30 is retracted and the card that is illustrated at 19 can be fed by the transfer roller 18 and idler roller 22 to the transfer roller 58 and its spring loaded idler roller 60. The positions of idler roller 60 and the idler roller 22 are both controlled by the cam mounted on shaft 50, which is driven by the same motor that is used to drive the cam 42 for controlling the position of the print head. When the print head is raised, the frame 52 is in its solid line position of FIG. 2 and the springs 24 and 54 will urge the idler rollers 22 and 60 into their working position against their respective driven transfer rollers. Transfer roller 58 is driven by motor 20 as well, through a suitable gear arrangement or other drive. The springs 24 and 54, as shown in FIG. 9, are bifurcated, and spring portions or legs bear against the opposite ends of the shafts for the respective idler rollers.

Figure 4:
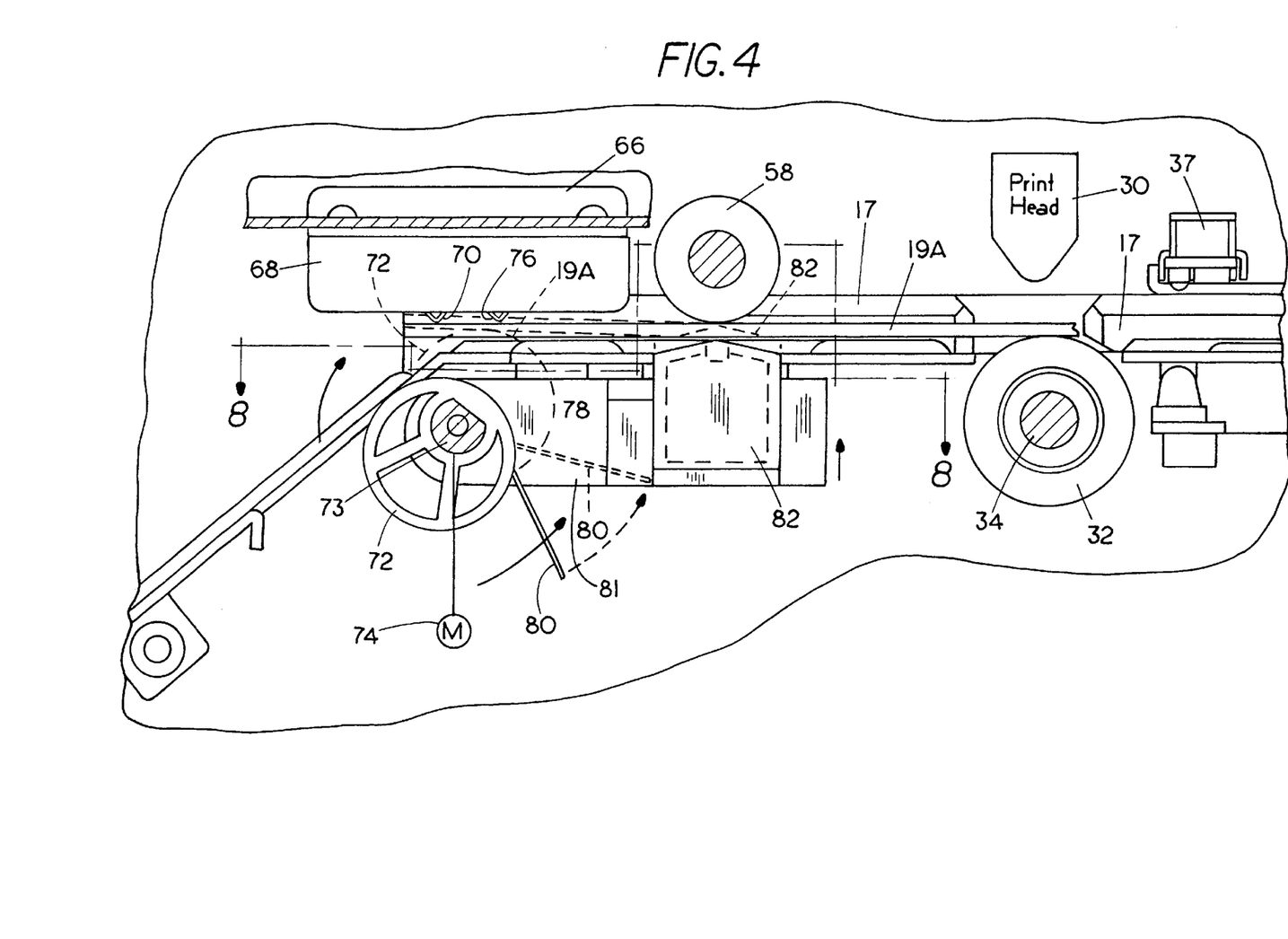
FIG. 4 is an enlarged side sectional view of smart card and magnetic strip encoding stations of the printer of the present invention.

The first step in processing the card is to move the card 19 to the transfer roller 58 and idler roller 60 and into a smart card encoding station indicated at 66 (see FIG. 4) that is used for encoding the chip or circuitry on the card for smart card use. Usually there is an embedded circuit chip in the card that will be encoded with information in a known manner and used later. As shown in FIG. 4, this station includes a housing 68 that has a position sensor shown at 70 which is one set of resilient contacts at the end of the housing 68 remote from the transfer roller 58.

The length of the card 19 is measured when the card is introduced through the transfer rollers 18 and idler roller 22 by counting the steps of the stepper motor 20 that drives the transfer roller. In this way sensor 37 is a card length sensor, as well as a presence sensor, and this card length information is used for moving the card back and forth during the printing operation, and encoding operations of the printer. Only one encoding station may be provided, if desired.

As shown in FIG. 4, when the transfer roller 58 drives a card 19A into this position, contacts on the card are below the contacts in line with sensor 70 and in line with an additional row of resilient contacts 76. The movement of the card as measured by control circuit 38 causes the control circuit to drive a motor 74 to rotate a cam 72 that is mounted on the shaft 73 driven from the motor 74. The cam is rotated to its position shown in dotted lines in FIGS. 4 and will bend the card 19A upwardly also shown in dotted lines so that the contacts on the card come into firm contact with the contacts 76 and the contacts in line with sensor 70 on the housing 68 for the encoding circuit. The controls then will encode the chip 78 that is in the card with the information that is desired. The information transferred is stored in the control 38 and is correlated to the information about the person whose name, address, etc. is to be printed on the card.

Figure 8:
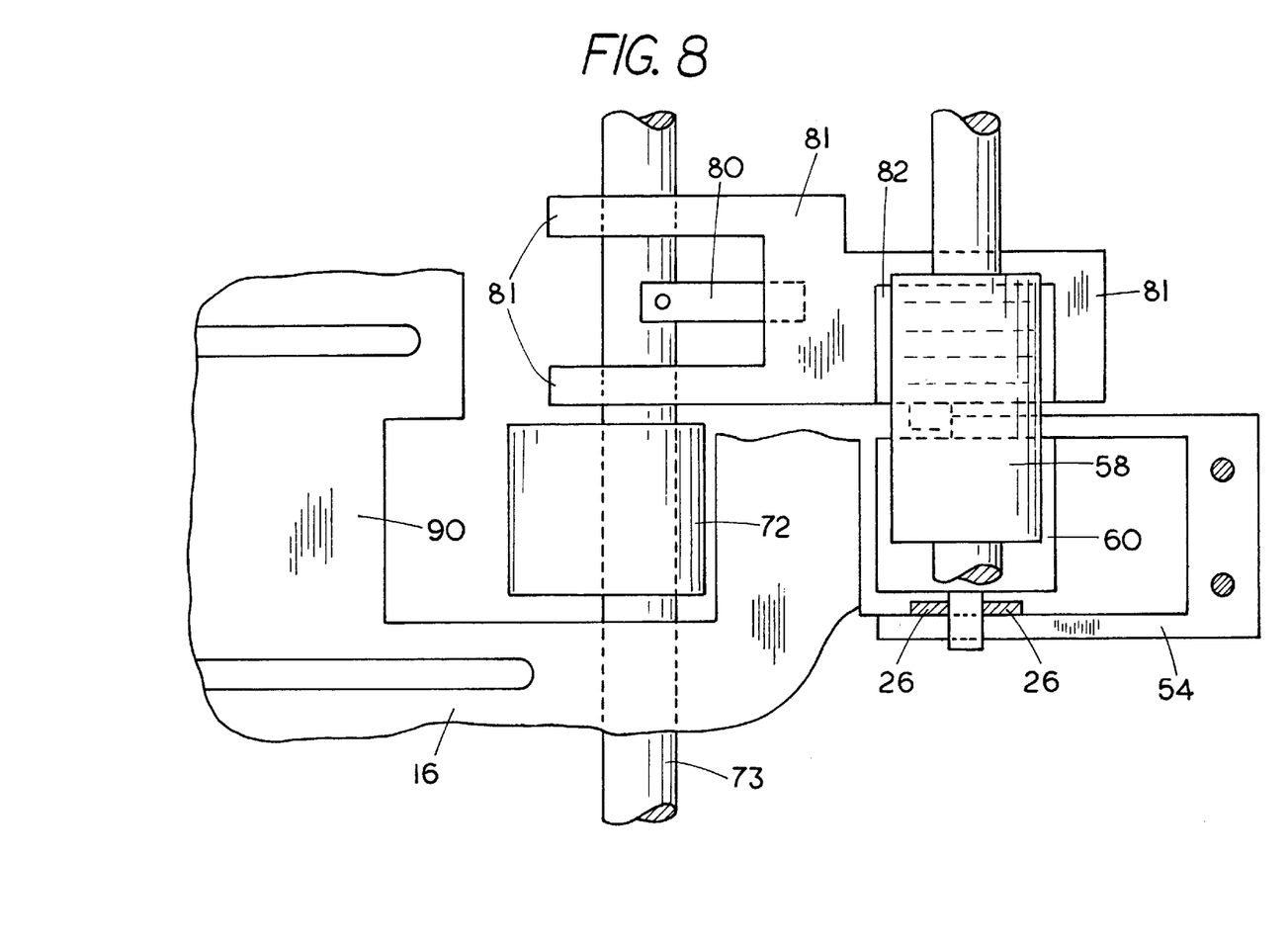
FIG. 8 is a part schematic view taken on line 8—8 in FIG. 4.

The cam 72 is then rotated to its solid line or home position after encoding the chip shown at 78. The card being processed is moved back so the magnetic strip is positioned properly relative to a second encoding station comprising a magnetic recording head 82, usually with the leading end of the card over the magnetic recording head 82. The shaft 73 is then rotated counterclockwise from its home position. As this is done, a leaf spring 80 mounted on shaft 73 moves against a mounting arm 81 which is pivoted on shaft 73 as shown in FIGS. 4 and 8. The arm 81 mounts the magnetic recording head 82, which is positioned to be aligned with transfer roller 58. The magnetic recording head 82 moves alongside the idler roller 60. The magnetic head 82 is held up against the card 19A which is held against the transfer roller 58 by the idler roller 60. The magnetic strip on the card, which is illustrated in FIG. 5 by a heavy line 84 on the card 19 in FIG. 5 will be moved forwardly (to the left in FIG. 4) across the recording head 82 by driving transfer roller 58. The head 82 is held upwardly to engage the magnetic strip under load of spring 80.

The shaft 73 is driven in a clockwise direction after encoding the magnetic strip to lower the magnetic recording head 82 by releasing the pressure of spring 80. The card is then reversed so the leading end again is over the head 82. The head 82 is raised by driving shaft 73 in a counterclockwise direction and then the card is driven forwardly to verify the data on the magnetic strip. The head 82 is again lowered and the card 19A will be driven in a reverse direction back toward the print head 30 and platen roller. The platen roller 32 is shown in FIG. 4 schematically as well.

The card that has been encoded thus can also be checked at the encoding stations right after encoding and before it is printed to make sure that the information that was desired has been encoded. The verification can be carried out on the chip on the card, as well, before moving the card from that station. The magnetic head 82 can be used as a read head to make sure that the information that is supposed to be encoded on the magnetic strip has been so encoded. This verification is a repetition of the "write" encoding process, but the components will be set for reading what is on the card to verify that it is good data.

When the card 19A is moved back to the platen roller 32, the print head 30 is lowered by cam 42 and by the action of spring 39B to move the arms 40 and holders 39 down along with the spring head. The print head 30 moves a provided ribbon to contact the card 19A under the pressure of spring 39B so the card is held between the platen roller 32 and the print head. At the same time the cam 42 is moved, the idler rollers 22 and 60 are retracted or lowered (see FIG. 3) by operation of the cam 51 on the cam shaft 50, which is driven when shaft 44 is driven so that the card 19A will no longer be held by the transfer rollers. The card 19A can move freely as driven by rotation of the platen roller 32. Platen roller 32 is driven by the stepper motor 36 under control of the central computer 38. The card being printed will be run back and forth under the print head 30 to print the necessary colors and images. The print head 30 will be lifted up when one printing pass is completed and the card is then shifted, the print head 30 lowered, and a new pass carried out, until the printing is done.

When the printing is completed, the cam shaft 44 is driven so cam 42 acts on follower 41A to raise the arms 40. The print head 30 and the idler rollers also raise. The card will then be fed out toward the encoding station to an exit ramp shown at 88, by the transfer roller 58. The idler rollers are engaged by the transfer rollers after retracting the print head 30.

The transfer rollers 18 and 58 can drive or hold a card when the idler rollers 22 and 60 move up under spring pressure against the respective transfer rollers so they would clamp the card. When the cam 72 is retracted as shown in solid lines in FIG. 2, the card will rest on the ribs 16A of the support wall 16 section underneath the encoding station 66, and then will slide down a support plate 90 at the exit end 88. The support plate 90 also can have ribs such as those shown at 16A for guiding support the card and making sure that it maintains a flat position.

The frame used is conventional and the mounting and bearings and the like for the transfer rollers are all well known and they would be mounted in the side plates of the mainframe. The support wall 16 has openings provided for the idler rollers, the magnetic head and support arm and various other components.

The operation of the cams 51 and 42 are synchronized, so that when the print head 30 comes down for working, it will contact the ribbon and card and then the idler roller 60 and 22 also are retracted or dropped down. Then there will no longer be a drive connection for the card 19A between the transfer rollers and their respective idler rollers. The printing is controlled only by rotation of the platen roller 32 when the printing head is down. The card 19A is always positively held by drive rollers throughout the process.

The process is repeated with each card that is to be printed, and can be noted that the thickness of the card is not critical, because the transfer rollers and the print head will provide for resilient engagement of the card during operation.

If RF or other non-contact encoding is used, the card (19A) is bent to be adjacent and associated with the encoding station and contacts are not needed.

Although the present invention has been described with reference to preferred embodiments, workers skilled in the art will recognize that changes may be made in form and detail without departing from the spirit and scope of the invention.

What is claimed is:

1. A card processing apparatus comprising a card transport for moving and holding the card in a plane, a printing station having a print head, the card transport comprising a drive roller and an idler roller that is normally urged toward the drive roller so that a card between the drive roller and idler roller is driven when the idler roller is in a working position, the card transport further including a rotatable platen roller for supporting and driving a card when printing is applied to the card with the print head, at least a first encoding station positioned such that the first encoding station lies offset transversely from the plane of movement of the card in the card transport in a direction normal to the plane of movement, an actuator for causing movement of a portion of the card transversely from the plane of movement of the card for operably associating the card with the first encoding station while at least a portion of the card remains held by the card transport in the plane of movement of the card, and a control for encoding information onto the card and for causing the drive roller of the card transport to release its drive to the card such that the rotatable platen is the sole drive for moving the card when printing is applied to the card.

2. The apparatus of claim 1, wherein the first encoding station encodes a first type of information on a first location on the card, a second encoding station for encoding a second type of information in a second location on the card, subsequent to the first encoding, the second location being different from the first location, the second encoding station being resiliently mounted and moved into association with the card as the card is held in the plane of movement in the card transport.

3. The apparatus of claims 2, wherein the second encoding station comprises a magnetic head, and a second actuator to move the magnetic head to engage a card under resilient force.

4. A card processing apparatus including a support and a card transport for moving and holding a card generally along a working plane, the card transport including a pair of drive rollers, a first encoding station positioned in registry with the working plane of movement of the card, an actuator to bend the card toward the first encoding station for operably associating the card with the first encoding station with a portion of the card held in the working plane of movement by the card transport, a central control for encoding information onto the card, and a card drive comprising a portion of the card transport for moving the card from the first encoding station to a printing station for printing on the card moving in the working plane, said actuator comprising a cam rotatably mounted adjacent the working plane of movement of the card, and rotatable from a first position wherein the cam is spaced from the working plane of movement to a second position wherein said cam engages a second end portion of the card while the first portion of the card is held in the first pair of drive rollers, so the first portion remains in the working plane of movement, and the cam deflects the second end portion card to be operatively associated with the first encoding station the cam being rotatable back to its first end positions.

5. The card processing apparatus of claim 4, wherein said card drive includes a pair of drive rollers on an input side of the printing station, and a pair of output drive rollers on an output side of said printing station, the printing station including a moveable print head and a card drive platen, a control to move the print head into contact with the card and simultaneously release the input and output drive rollers from driving the card at substantially the same time as the print head moves into contact with the card, a drive to rotate the platen, and provide the sole drive for the card for printing on the card when the input and output drive rollers are released.

6. The card processing apparatus of claim 4 and a second encoding station comprising a magnetic head resiliently urged to engage the card as the card moves in the plane of movement.

7. The card processing apparatus of claim 6, wherein the first encoding station is on a first side of the card, and the magnetic head is on an opposite side of the card from the first encoding station, the rotatable cam that deflects the first portion of the card being reversible, and having a movable spring mounted thereon that engages the magnetic head to resiliently urge the magnetic head to engage the card.

8. A card processing apparatus including a support for moving a card through the apparatus along a plane, a first encoding station positioned in registry with the plane of movement of the card, a pair of rollers for driving the card along the plane and operable to hold a first portion of a card in the plane, an actuator to move at least a second portion of the card toward the first encoding station when the card is moved into registry with the first encoding station while the first portion of the card is held by the rollers for operably engaging the card with the encoding station, a central control for encoding information onto the card, the pair of drive rollers moving the card from the first encoding station to a printer station for printing on the card, the printing station including a rotatable platen, and a print head movable toward and away from the platen, the rotatable platen driving the card when the print head is moved to a printing position against a card between the print head and the platen, one of the drive rollers being yieldably mounted relative to the other, the print head and the one drive roller being controlled so that when the print head is moved to the printing position the one drive rollers is moved to disengage from a card held in the drive rollers and the platen is the sole drive controlling movement of the card during printing on the card.

9. The card processing of apparatus of claim 8, wherein said actuator comprises a cam rotatably mounted adjacent the path of movement of the card and rotatable to a position wherein said cam engages a card and urges a card against the first encoding station.

10. The card processing apparatus of claim 8, wherein print head and one drive roller are moved by separate cams, said separate cams being driven by a single drive motor.

11. A card printer apparatus for printing on a card drive comprising a pair of drive rollers for holding a moving the card along a plane to a printer station for printing information on the card, the printing station including a rotatable platen and a print head movable toward and away from the platen, one of the drive rollers of the pair being yieldably mounted relative to the other drive roller, and a central controller, drive members controlling movement of the print head and one drive roller, the drive members for the print head and the one drive roller being controlled by the controller so that when the print head is moved to a printing position relative to the rotatable platen the one drive roller is moved to release a card held in the pair of drive rollers, and the rotatable platen then forms the sole drive to drive the card past the printer head.

* * * * *

UNITED STATES PATENT AND TRADEMARK OFFICE
CERTIFICATE OF CORRECTION

PATENT NO. : 6,543,685 B1 Page 1 of 1
DATED : April 8, 2003
INVENTOR(S) : Brent D. Lien, Darren W. Haas and Matthew K. Dunham It is certified that error appears in the above-identified patent and that said Letters Patent is hereby corrected as shown below:

<u>Column 8,</u>
Line 29, delete "rollers" and insert -- roller --.
Line 42, delete "a" and insert -- and --.

Signed and Sealed this

Sixteenth Day of March, 2004

JON W. DUDAS
*Acting Director of the United States Patent and Trademark Office*